T. S. GRIMES.
REVOLVING DOUBLE BOX COTTON PRESS.
APPLICATION FILED NOV. 22, 1911.
1,068,336.
Patented July 22, 1913.
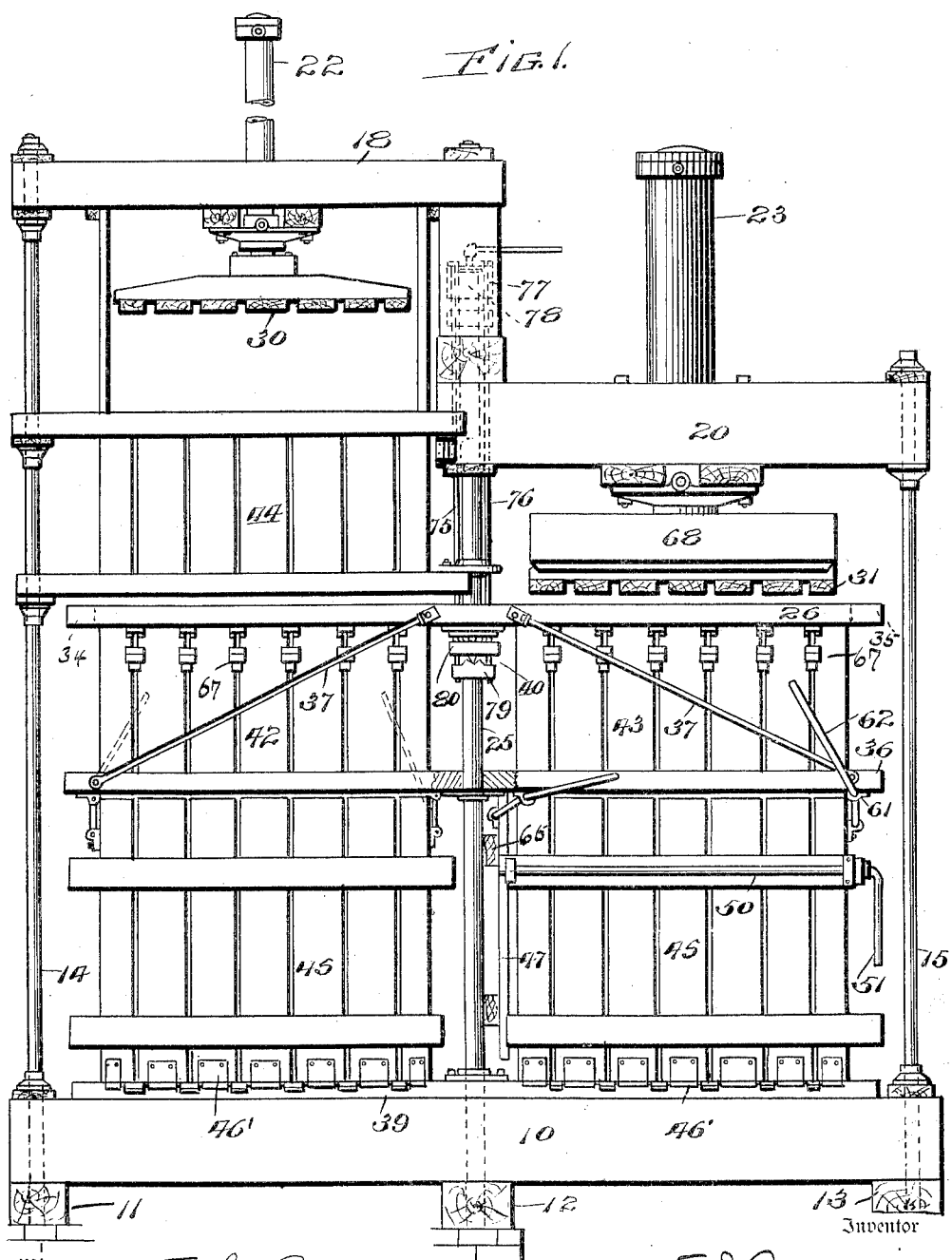

T. S. GRIMES.
REVOLVING DOUBLE BOX COTTON PRESS.
APPLICATION FILED NOV. 22, 1911.
1,068,336.
Patented July 22, 1913.
3 SHEETS—SHEET 2.
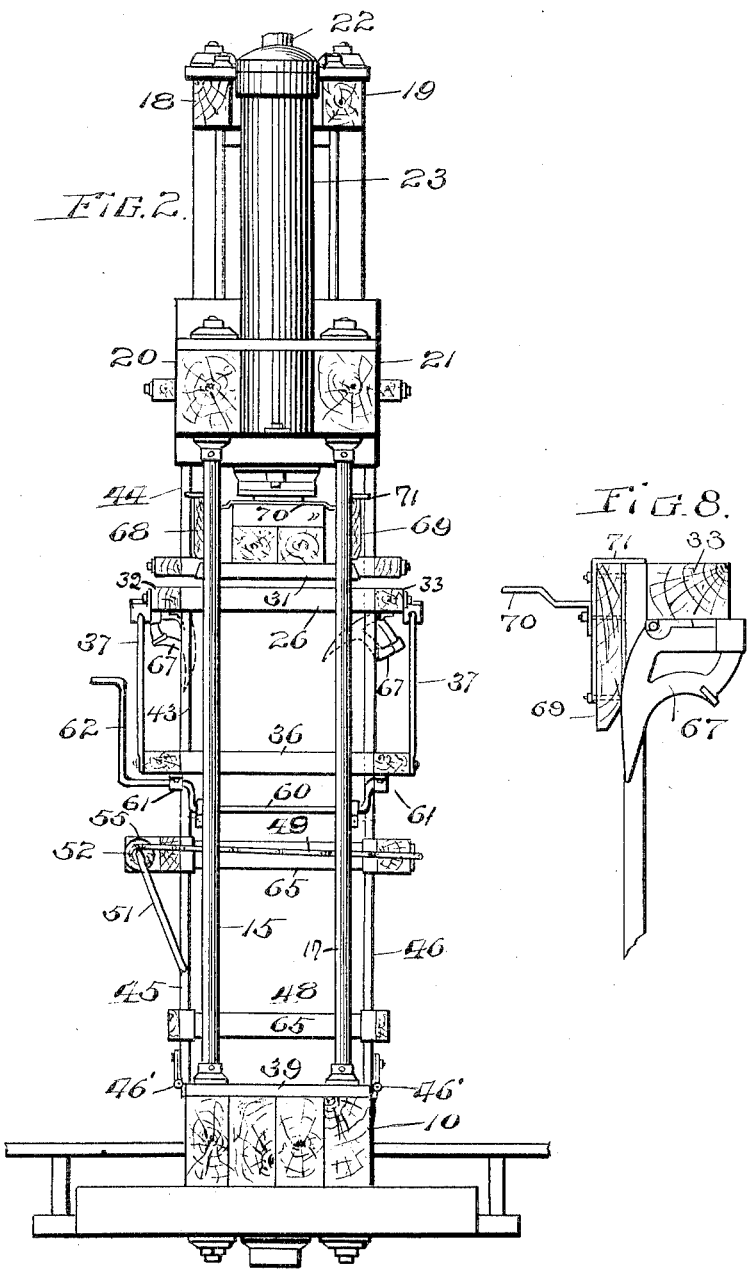

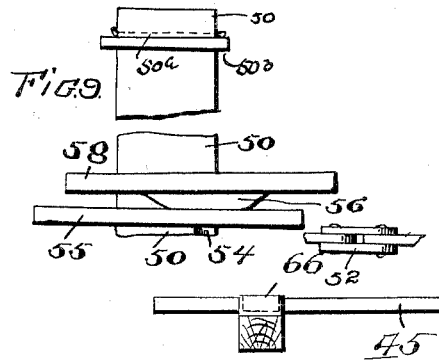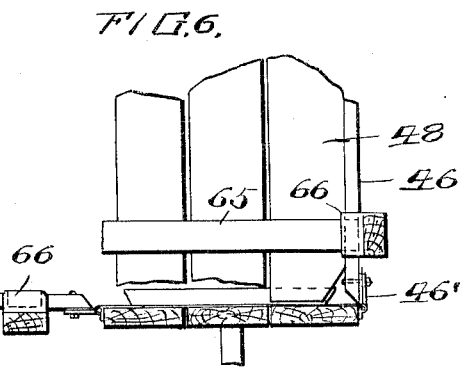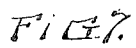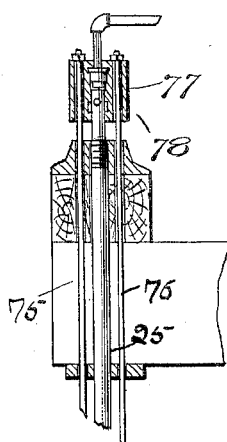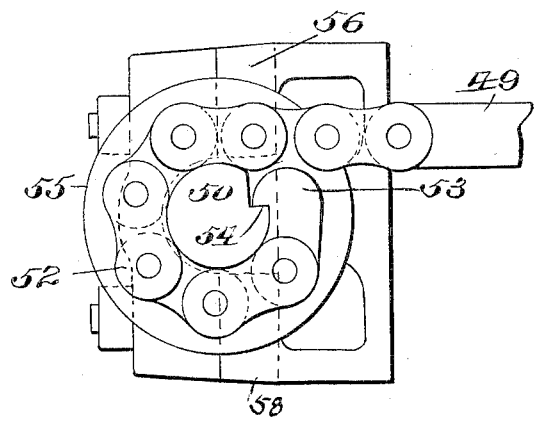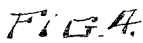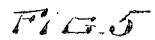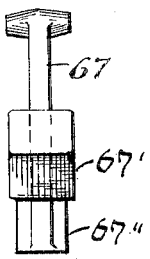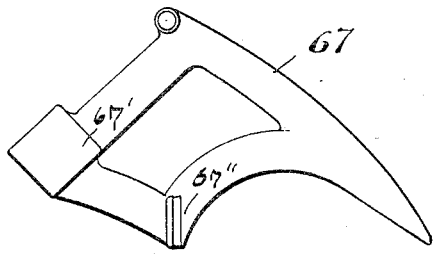

UNITED STATES PATENT OFFICE.

THADDEUS S. GRIMES, OF COLUMBUS, GEORGIA, ASSIGNOR TO LUMMUS COTTON GIN CO., OF MUSCOGEE COUNTY, GEORGIA, A CORPORATION OF GEORGIA.

REVOLVING DOUBLE-BOX COTTON-PRESS.

1,068,336.  Specification of Letters Patent.  Patented July 22, 1913.

Application filed November 22, 1911. Serial No. 661,810.

*To all whom it may concern:*

Be it known that I, THADDEUS S. GRIMES, a citizen of the United States, residing at Columbus, in the county of Muscogee and State of Georgia, have invented certain new and useful Improvements in Revolving Double-Box Cotton-Presses; and I do hereby declare the following to be a full, clear, and exact description of the invention, such as will enable others skilled in the art to which it appertains to make and use the same.

This invention relates to revolving double box cotton presses and it consists in locating a plurality of press boxes above a continuous base portion or foundation and providing a plurality of devices for operating upon the cotton within said boxes, both of such devices being located above the base.

The invention resides further in providing means for lifting the boxes from the base, and also in lifting the boxes and rotating them while in an elevated position.

Furthermore, the invention resides in providing improved means for controlling the doors of the press boxes, improved means for retaining the cotton in the boxes while being compressed or packed, in providing hydraulic means for effecting the tramping and packing, and in other features of construction hereinafter described and claimed.

In the accompanying drawings forming part of this application: Figure 1 is a view of the double box press in side elevation. Fig. 2 is an end view thereof. Fig. 3 is a view of a portion of the device for operating the side doors of the boxes. Figs. 4 and 5 are detail views of the dogs for retaining the cotton within the boxes. Fig. 6 is a detail view showing one of the side doors opened. Fig. 7 is a detail partly in vertical section of the hydraulic device for lifting the boxes. Fig. 8 is a detail view showing one of the dogs for retaining the cotton in the boxes and the means for controlling the dogs. Fig. 9 is a view of the construction shown in Fig. 3 looking downwardly.

In carrying out my invention, I provide a structure having a continuous and solid base portion or foundation 10 suitably supported as at 11, 12 and 13 and having uprights mounted upon said base portion 10 and supporting the upper portion of the structure. Three of these uprights are designated in the drawings as 14, 15, and 17. This upper portion includes transverse timbers 18 and 19, 20 and 21 upon which the cylinders of the hydraulic tramping and packing devices 22 and 23 are mounted.

One of the important features of the present device consists in the employment of hydraulic means for operating upon the cotton in both of the boxes.

Mounted centrally of the framework is a vertical shaft 25 carrying a framework 26 which is made rotatable in order to provide for the transfer of the boxes from beneath the tramping device to a point beneath the packing device.

The tramping device or plunger is indicated by 30 and the packing plunger by 31. The framework 26 comprises parallelly arranged side bars 32 and 33 connected by end timbers 34 and 35, and a similar framework 36 is carried by upright shaft 25 below the aforesaid framework 26. Diagonally arranged tie bars 37 extend from the outer ends of framework 36 to the side bars of frame 26 at points near the central portion thereof. A ball bearing 40 is provided on vertical shaft or column 25, and the frames 26 and 36 are carried thereon.

The press box 42 is shown in Fig. 1 as being located beneath the tramping device 30 and press box 43 as beneath packing plunger 31. Above press box 42 is a stationary receiving box 44 carried by the framework and designed to receive the cotton as it is discharged from the condenser. The press boxes are provided with side doors 45 and 46 and with end doors 47 and 48, the former being hinged to transverse member 39 (constituting a bottom member), by means of hinges 46′, and being secured by means of devices 49 operated by horizontal shaft 50 and cranks 51, together with chains 52. These chains 52 have connected with the ends thereof hooks 53 engaging notches 54 in shaft 50. The chains are wound around the shaft last mentioned, against collars 55, which latter have frictional contact with one or more surfaces 56 on castings 58. By reason of this frictional contact, the rotation of the shaft before mentioned and the unwinding of the chain is effectively controlled; the frictional contact is in proportion to the pressure on the doors. In Fig. 9 a view of the construction of Fig. 3 appears in top plan. Shaft 50 is held in a given position by means of a cotter pin $50^a$, and one end is received by bearing 50$^b$. By this means the collar is held against frictional surface 56 sufficiently close to prevent the sudden dropping of the doors when they are released. The end doors are raised and permitted to swing outwardly by virtue of the connection of said doors with shaft 60, mounted in brackets 61 formed as shown in Fig. 2. Said shaft is in effect a rock shaft, and is provided with a crank 62 for operating the same. The cross pieces 65 of the end doors project beyond the edges thereof, and are engaged by socket members 66 carried by the side doors, whereby the end doors are effectively secured.

Pivoted and weighted dogs 67 are carried by the upper side portions of the press boxes, and upon the downward stroke of the plunger 31 are thrown outwardly by guard members 68 and 69 carried by the plunger. These guard members are secured to transverse members 70 carried by the plunger proper. Stops 71 in the form of angle irons project outwardly a sufficient distance to engage the upper edges of the boxes. The guard members cause the dogs to swing out of the path of the plunger during its downward stroke, and permit them to swing into normal or operative position as soon as the bottom of the plunger has returned above the point of the dogs. On the tramping side, the plunger can pass up and down without touching the dogs. As the tramper forces the cotton down by the dogs, the latter are forced outwardly until the plunger has caried the cotton below them, when they swing into position over the cotton, as the tramper moves upwardly.

Central shaft or column 25 carrying the rotatable device or structure comprising frame 26 and frame 36 carries also transverse member 39 to which the side doors are hinged. Lifting rods 75 and 76 are connected with cylinder 77 of the hydraulic lifting device 78 mounted centrally of the upper portion of the structure, and these lifting rods have connection with a collar 79 which is brought into contact with a ring 80 forming a part of ball bearing device 40. The operation of the hydraulic lifting device will therefore raise the rotatable device including frames 26 and 36 and permit of their rotation about shaft or column 25 as an axis, the press boxes being by this operation shifted from beneath one plunger to a point beneath the other. It is obvious that shaft 25 constitutes a guiding member for the frames 26 and 36, as well as an axis therefor.

What I claim is:

1. In a press, a supporting structure including a base, a box mounted above the base, a plunger therein, means permitting the shifting of the box within the structure, a shaft and means operated by hydraulic pressure movable longitudinally with reference thereto for lifting the box from the base.

2. In a press, a supporting structure including a base, a box mounted above the base, a plunger therein, means permitting the shifting of the box from one portion of the base to another, a shaft and means operated by hydraulic pressure movable longitudinally with reference thereto for lifting the box from the base.

3. In a press, a supporting structure including a base, a rotatable device mounted above the base, a press box carried by the said device, a plunger for said box, a shaft and means operated by hydraulic pressure movable longitudinally with reference thereto for lifting the box from the base.

4. In a press, a supporting structure including a base, a rotatable device mounted above the base, a stationary shaft for carrying said device, a press box carried by said device, a plunger for the box, and means movable with reference to the stationary shaft for freeing the box and rotatable device from the base.

5. In a press, a structure including a base, a rotatable device mounted above the base, a guiding member for carrying the rotatable device, a plurality of press boxes carried by said device, a plunger for each of the boxes, such rotatable device being supported by the base, and means for freeing such rotatable device from the base, such means including a vertically reciprocating device movable with reference to the guiding member by hydraulic pressure.

6. In a press, a supporting structure including a base, a plurality of press boxes mounted above the base, a plunger for each of said boxes, doors for the boxes, a transverse member constituting a portion of the supporting structure, and means for connecting certain of the doors with said transverse member, a stationary guiding member and means for lifting the transverse member and boxes by pressure exerted on the guiding member.

7. In a press, a supporting structure including a base, a plurality of press boxes mounted above the base, a plunger for each of said boxes, means for operating the plungers in the same direction with reference to the base, a rotatable supporting device for the boxes and means for pivotally connecting portions of said boxes with the rotatable device, and independent means for elevating and swinging outwardly other portions of the boxes.

8. In a press, a supporting structure including a base, a plurality of press boxes mounted above the base, a plunger for each of said boxes, and means for operating said plungers in the same direction with reference to the base, said means being actuated by hydraulic pressure, a rotatable supporting device for the boxes and means for pivotally connecting portions of said boxes with the rotatable device, and independent means for elevating and swinging outwardly other portions of the boxes.

9. In a press, a supporting structure including a base, a transverse member located above the base and movable in a plane substantially parallel therewith, a plurality of press boxes above the transverse member, doors for the boxes, certain of the doors having hinged connection with the transverse member, means whereby the doors last mentioned retain in position other of said doors which latter are independently mounted, plungers for the boxes, and means for operating the plungers in the same direction with reference to the transverse member and base.

10. In a press, a structure including a base, a shaft, a transverse member located above the base and carried by the shaft, the latter constituting an axis for the transverse member, a plurality of press boxes, doors therefor, certain of the doors having hinged connection with the transverse member, a second transverse member above the boxes and spaced from the transverse member first mentioned certain of the doors having pivotal connection with the second transverse member, means whereby the doors last mentioned are retained in position until the hinged doors are released, plungers for the boxes, and means for operating the plungers in the same direction with reference to the transverse member and base.

11. In a press, a press box, doors for the sides and ends of the box, cross pieces carried by the end doors, sockets carried by the side doors for receiving the ends of the cross pieces and securing said end doors.

12. In a press, a press box, doors for the sides and ends of the box, and means for lifting the end doors and simultaneously moving them outwardly.

13. In a press, a press box, doors for the sides and ends of the box, and means for lifting the end doors and simultaneously moving them outwardly while in a substantially vertical position.

14. In a press, a press box, doors for the sides and ends of the box, and means for lifting the end doors and simultaneously moving them outwardly, said means including a crank shaft.

15. In a press, a box, a plunger for the same, weighted dogs pivotally mounted in the sides of the box, and means carried by the plunger for controlling the dogs, said means including members extending substantially parallel with the sides of the plunger and arranged to move in proximity to the inner walls of the box, at the top thereof, bars extending transversely of said members and plunger, and stops projecting beyond the members, and adapted to engage the top of the box.

16. In a press, a box, a plunger therefor, a plurality of pivoted and weighted dogs carried by the sides of the box, and means connected with the plunger and coöperating with the dogs for moving the latter and preventing their return to normal position until the plunger has reached a predetermined point.

17. In a press, a plurality of press boxes, a plurality of plungers for the boxes, a rotatable device for carrying the boxes, elevating means for said device and a stationary receiving box mounted above one of the boxes first mentioned and means for operating the plungers, said means last mentioned and the said elevating means being operated by hydraulic pressure.

18. In a press, a box, a plurality of doors, a stationary member suitably mounted, a flexible device connected with one of the doors, a rotatable device mounted on the stationary member, and means for effecting frictional contact with the rotatable device for retarding the movement thereof.

19. In a press, a box, a plurality of doors therefor, a stationary bearing member suitably mounted, a frictional collar mounted to rotate on the stationary member, a flexible device connected with the collar and with one of the doors, and means for effecting frictional contact with the collar in proportion to the pressure on the door last mentioned.

20. In a press, a box, a plunger for the same, dogs pivotally mounted on the sides of the box and means carried by the plunger for controlling the dogs.

In testimony whereof I affix my signature in presence of two witnesses.

THADDEUS S. GRIMES.

Witnesses:
K. ROSCOE LUMMUS,
R. L. BRASWELL.

---

Copies of this patent may be obtained for five cents each, by addressing the "Commissioner of Patents, Washington, D. C."